UNITED STATES PATENT OFFICE 2,443,118

PREPARATION OF TRICHLORO ACIDS

Ralph E. Plump, Haddonfield, N. J., assignor to The Pennsylvania Salt Manufacturing Company, Philadelphia, Pa., a corporation of Pennsylvania No Drawing. Application September 8, 1944, Serial No. 553,287

10 Claims. (Cl. 260—530)

This invention relates to a process for the preparation of trichloro acids of the type represented by trichloroacetic acid and 2,2,3, trichlorobutyric acid from trichloroaldehyde and more particularly it relates to a preparation by which these chloro acids may be safely, readily and economically prepared by the oxidation of their corresponding chloroaldehydes employing a water soluble hypochlorite.

In industrial practice, concentrated or fuming nitric acid has been employed to oxidize trichloroaldehydes to their corresponding acids. The use of nitric acid makes the process relatively expensive. It must be carried out in specialized, non-corrosive equipment and provision must be made for the disposal of the fumes of nitrogen dioxide evolved. It is apparent, therefore, that the use of nitric acid in the preparation of a trichloro acid from its corresponding trichloroaldehyde is not what might be considered a safe, readily and economically performed process.

An object of this invention is to provide a safe, readily and economically performed method for the production of an organic chloro acid from its corresponding aldehyde by means of an inexpensive and readily available oxidizing agent.

Another object of this invention is to provide a process for the production of a trichloro acid which may be conducted in non-specialized equipment and which presents little or no fume disposal problem.

A further object of this invention is to provide a process for the oxidation of a trichloroaldehyde to the corresponding trichloro acid by means of hypochlorite ion, which process may be performed safely and simply to produce a good yield of the trichloro acid desired.

A still further object of this invention is to provide a process for the direct production of a trichloro acid salt which is readily removed from the reaction mass in which it is produced obtaining practically no side reaction and correspondingly high yields of pure product.

Other objects and advantages will be apparent from a consideration of this specification and the claims.

According to this invention the trichloroaldehyde to be oxidized is reacted with hypochlorite ion in a safe, simply performed and direct one-step operation without resort to involved and expensive methods of operation to produce a good yield of suitably pure trichloro acid, the hypochlorite ion being provided by means of a hypochlorite solution or other known methods.

The process is applicable to the preparation, for example, of trichloroacetic acid and trichloropropionic acid. Generally, it is applicable to the preparation of acids which may be represented by the formula R—CCl$_2$.COOH where R is selected from the group consisting of Cl—, CH$_2$Cl—, and CH$_3$.CHCl—. For example, when R is chlorine, the chloro acid is trichloroacetic acid; when R is CH$_2$Cl, the chloro acid is 2,2,3 trichloropropionic acid; and when R is CH$_3$.CHCl— the chloro acid is 2,2,3 trichlorobutyric acid. The corresponding chloroaldehydes are employed and these may be represented by the formula R.CCl$_2$.CHO where R is selected from the group above stated. The chloroaldehyde employed may be anhydrous or hydrated.

The reaction can be illustrated by the following formula:

R.CCl$_2$.CHO+OCl$^-$→R.CCl$_2$.COOH+Cl$^-$

The hypochlorite ion may be supplied in any known manner, for example, in the form of a calcium hypochlorite solution. Also, the hypochlorite can be formed in situ by chlorination of the reaction mixture containing the chloroaldehyde and alkaline base or other material which with chlorine will encourage formation of hypochlorite ions, even if temporarily. Such material can advantageously be calcium carbonate.

The hypochlorite ion is preferably supplied employing calcium hypochlorite, particularly for reasons which will appear hereinafter. Sodium hypochlorite can be employed if its usually high alkalinity is reduced by such material as calcium chloride which has a neutralizing action. The hypochlorite might be formed in situ by introducing chlorine into a mixture of the trichloroaldehyde, water and an alkaline base or material such as calcium carbonate, sodium carbonate, or a cooled calcium hydroxide slurry, thus producing hypochlorite ion and offering better means of controlling the oxidation.

In one embodiment of the process the trichloroaldehyde or its hydrate is diluted with 1–5 parts of water by weight, a pH controlling agent is added, the mixture is heated at a temperature within the range 50–95° C. and hypochlorite in an approximately equivalent amount based on the aldehyde is slowly added, the reaction being moderated by cooling. When the larger part of the reaction has been completed, that is, when heat is no longer being generated, the reaction mixture is heated a short time to bring the reaction to completion. Insoluble foreign material if present is removed by filtration while hot and the liquor is then concentrated or chilled to obtain the organic acid salt. Alternatively it can be acidified with mineral acid, blown with steam for a short time to destroy any small quantity of unreacted hypochlorite and extracted for the free acid.

In general the operating conditions may vary widely. However, according to the invention, the limits of acidity and basicity are to be controlled. It has been found that if the reaction medium is more acid than would be represented by the trichloro acid to be produced there is such a rapid decomposition of the hypochlorite to chlorine that the desired oxidation is not properly accomplished. Also a hot basic medium, for example, a lime slurry, would convert the aldehyde, in the case of trichloroacetaldehyde, to chloroform, so rapidly that a low yield of the desired acid would be obtained. Accordingly, the use of a buffering or a pH controlling agent is advantageous. For example, it has been found that at least neutral conditions should be employed and preferably the pH should be within the range of 2-7. This value can usually be accomplished by the addition of from about one-fifth mol to one mol of pH controlling agent per mol of aldehyde.

In some cases it might be advantageous to employ some of the acid to be produced in order to arrive at the desired acidity.

Another advantage resulting from control of the pH of the reacting mass is that the generation, through side reactions, of chlorine, chloroform, propylidene chloride, etc., is reduced to a negligible amount with corresponding increase in yields and elimination of fume disposal problems. For example, one side reaction is that which can occur between the acid, as it is formed, and the chloride ions remaining after the reduction of the hypochlorite ion, forming chlorine as follows:

$$2H^+ + Cl^- + OCl^- \rightarrow Cl_2 + H_2O$$

By suitable control of the pH of the reacting mass it has been found possible to avoid substantially all of this type of reaction. Therefore, while in an unbuffered system there will be a waste of oxidizing agent and a quantity of aldehyde will remain unconverted necessitating its removal before pure acid or its salt can be recovered, in a suitably buffered reaction mass the oxidation will proceed substantially quantitatively yielding a pure product, without side reactions and their attendant lowered yields and other problems as discussed herein.

The amount of water in the reaction mixture does not appear to be critical. Some reaction occurs when dry calcium hypochlorite and trichloroaldehyde are ground together at room temperature and also when five times the weight of the trichloroaldehyde is added as water.

A minimum temperature appears to be fixed before a practical reaction rate is attained with trichloroacetaldehyde. This minimum temperature appears to be about 50° C. With the trichloropropionaldehyde the temperature of initial reaction is about 60° C. With trichlorobutyraldehyde it appears to be about 70° C. A temperature as high as the boiling point of the aqueous reaction mixture can be employed. No advantage is to be derived by performing the reaction at a higher temperature.

The use of water in the process presents a safety advantage in that if the oxidation should, for some reason, proceed too rapidly, the presence of water will act as a moderating means. In connection with safety, it should be noted that the use of hypochlorite ion, whether supplied by a hypochlorite or formed in situ, presents no danger and can result in no serious burns on contact with the skin when ordinary precautions are observed. The following examples are given by way of illustration.

1. Trichlorobutyraldehyde (98 grams) and 20 grams of 2,2,3 trichlorobutyric acid in 200 cubic centimeters $H_2O$ were heated to 65–70° C. and to this solution "Perchloron" (a commercial calcium hypochlorite) was added with agitation, in 10 grams portions until about 55 grams had been used. The reaction liquid was cooled to 60° C., filtered, and the filtrate was acidified with concentrated HCl. On extraction a total of 52.3 grams of 2,2,3 trichlorobutyric acid was obtained not including the 20 grams introduced at the start, and about 6 cubic centimeters of 1,1,1,2, tetrachloropropane.

2. Trichloroacetaldehyde (165 grams) and 20 grams of $CaCO_3$ were mixed in 250 cubic centimeters of water and heated to 50–60° C. when the slow addition of 102 grams of "Perchloron" was begun with constant agitation and good cooling. After adding all of the "Perchloron" at 50–60° C. the reaction mixture was placed on the steam bath for 45 minutes, and then filtered. On concentrating the filtrate and chilling, 140 grams of crystalline solid were obtained, which, calculated as $Ca(CCl_3COO)_2 \cdot 3\frac{1}{2}H_2O$, indicated 65.4% conversion. An additional 5% of trichloroacetic acid was obtained by acidification and extraction of the aqueous residue.

3. Commercial trichlorobutyraldehyde (195 grams) was dissolved in 500 cubic centimeters of water at 70° C., 20 grams of calcium carbonate were added, and to this mixture 102 grams of "Perchloron" (about 70% $Ca(OCl)_2$) were added at a rate which sustained the temperature at 70–80° C. with external cooling. When the main reaction was practically complete, the batch was heated on the steam bath for ½ hour and was then filtered. A small quantity of chloropropanes separated but acidification and extraction of the aqueous layer yielded 2,2,3 trichlorobutyric acid in about 46.8% conversion.

4. Commercial trichlorobutyraldehyde hydrate (100 grams) in 100 cubic centimeters of water containing 50 grams of technical calcium chloride was treated with 50 grams of "Perchloron" at a rate which maintained the reaction temperature at 80–95° C. Thickening of the batch occurred and when it was tested with litmus was found to be neutral. When the main reaction appeared to be finished, the mixture was heated on the steam bath for 5 minutes, 100 cubic centimeters of water was added, and essentially a steam distillation was carried on since about 20 grams of unreacted trichlorobutyraldehyde hydrate and chloropropanes were recovered. The principal product was acidified with concentrated hydrochloric acid and repeated extraction with carbon tetrachloride gave 43 grams of 2,2,3 trichlorobutyric acid or about 45 mol per cent conversion.

5. Commercial trichlorobutyraldehyde hydrate (20 grams), 2,2,3 trichlorobutyric acid (20 grams) and 12 grams of "Perchloron" were mixed well and slowly heated to 70° C. when reaction occurred and much chlorine was observed. The originally rather thin melt became very thick and 25 cubic centimeters of water were therefore added. After heating a short time longer at 70-85° C., the mixture was acidified with 20 cubic centimeters of concentrated hydrochloric acid which generated more chlorine, and threw down the usual oily layer of technical 2,2,3 trichlorobutyric acid. This contained 7 grams more than the added starting acid, indicating a conversion of about 37%.

Modification within the scope of the following claims is possible the essence of the invention being that hypochlorite ion is employed to oxidize a trichloroaldehyde to a corresponding trichloro acid in a safe, simply performed and economical manner.

I claim:

1. A process for the preparation of a trichloro acid of the formula $R-CCl_2.COOH$ where R is selected from the group consisting of $Cl-$, $CH_2Cl-$ and $CH_3CHCl$ which comprises reacting the trichloroaldehyde corresponding to said acid the presence of at least a small amount of water, with a hypochlorite which furnishes hypochlorite ion in the presence of said water, at a temperature within the range 50° C.-100° C. and wherein the pH of the reacting mixture is maintained at a value within the range 2-7.

2. A process for the preparation of trichloroacetic acid which comprises reacting trichloroacetaldehyde in the presence of at least a small amount of water, with a hypochlorite which furnishes hypochlorite ion in the presence of said water, at a temperature within the range 50° C.-100° C., and maintaining the pH at a value not substantially above 7 during said reaction.

3. A process according to claim 2 wherein the hypochlorite ion is supplied by calcium hypochlorite and the pH of the reacting mixture is controlled to within the range 2-7.

4. A process for the preparation of trichloropropionic acid which comprises reacting trichloropropionaldehyde, in the presence of at least a small amount of water, with a hypochlorite which furnishes hypochlorite ion in the presence of said water, at a temperature within the range 60° C.-100° C., and maintaining the pH at a value not substantially above 7 during said reaction.

5. A process according to claim 4 wherein the hypochlorite is supplied by calcium hypochlorite and the pH of the reacting mixture is controlled to within the range 2-7.

6. A process for the preparation of trichlorobutyric acid which comprises reacting trichlorobutyraldehyde, in the presence of at least a small amount of water, with a hypochlorite which furnishes hypochlorite ion in the presence of said water, at a temperature within the range 70° C.-100° C., and maintaining the pH at a value not substantially above 7 during said reaction.

7. A process according to claim 6 wherein the hypochlorite ion is supplied by calcium hypochlorite and the pH of the reacting mixture is controlled to within the range 2-7.

8. A process for the preparation of a trichloro acid of the formula $R.CCl_2.COOH$ where R is selected from the group consisting of $Cl-$, $CH_2Cl-$, and $CH_3CHCl-$ which comprises reacting the trichloro aldehyde corresponding to said acid, in the presence of at least a small amount of water, with a hypochlorite which furnishes hypochlorite ion in the presence of said water, at a temperature sufficient to initiate the reaction and within the range from 50° C. to the boiling point of the reaction mixture, and maintaining the pH at a value not substantially above 7 during said reaction.

9. A process according to claim 8 wherein the hypochlorite ion is furnished by calcium hypochlorite and the pH of the reacting mixture is controlled to within the range 2 to 7.

10. A process according to claim 8, wherein the pH is controlled to a value within the range 2 to 7 by addition of a buffering agent.

RALPH E. PLUMP.

REFERENCES CITED

The following references are of record in the file of this patent:

UNITED STATES PATENTS

| Number | Name | Date |
| --- | --- | --- |
| 2,146,282 | Berg et al. | Feb. 7, 1939 |
| 2,192,142 | Meitzner | Feb. 27, 1940 |
| 2,338,115 | Isbell | Jan. 4, 1944 |
| 2,367,251 | Weijlard et al. | Jan. 16, 1945 |

OTHER REFERENCES

Clermont, Liebig's Annalen, vol. 161, page 128 (1872).

Wallach, Berichte (Deutsch Chem. Gesell), vol., 5, page 256 (1872).

Kolbe, Liebig's Annalen, vol. 54, pages 183-184 (1845).

Clermont, Liebig's Annalen, vol. 166, page 64 (1873).

Seubert, Berichte (Deutsch. Chem. Gesell), vol. 18, page 3336 (1885).

Clermont, Armales der Chnie (6) vol. 6, pages 135-136 (1885).

Clermont, Compt Rendus (Fr. Acad. Sci.) vol. 73, page 113.

Clermont, Compt Rendus (Fr. Acad. Sci.) vol. 74, page 1492.

Kolbe et al., Beilstein (4th ed.), vol. 2 (1920), page 206.